Figure 1:
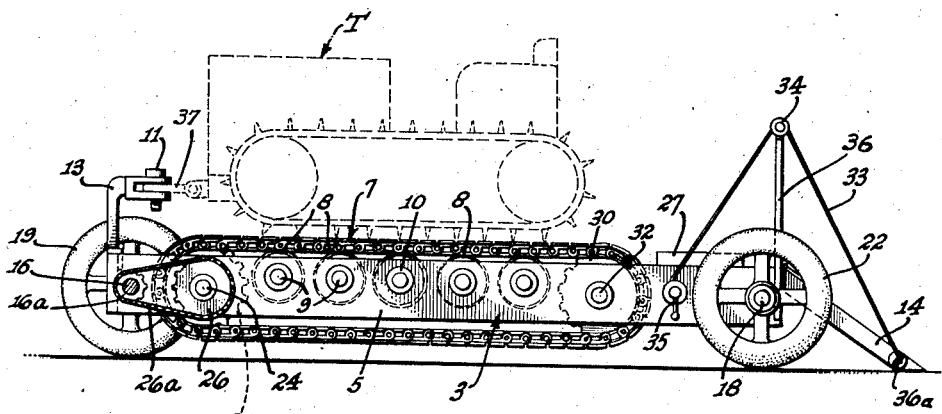

Jan. 26, 1943.  E. A. McCLENEGHAN  2,309,198
TRANSPORTER OF TRACTORS AND OTHER EQUIPMENT
Filed Dec. 23, 1940

INVENTOR:
EVATT A. McCLENEGHAN,
BY Everett M Curtis
ATTORNEYS.

Patented Jan. 26, 1943

2,309,198

UNITED STATES PATENT OFFICE 2,309,198

TRANSPORTER OF TRACTORS AND OTHER EQUIPMENT

Evatt A. McCleneghan, Encinitas, Calif.

Application December 23, 1940, Serial No. 371,327

12 Claims. (Cl. 214—85)

My invention relates to transporters for tractors and other equipment provided with caterpillar treads and its objects are to facilitate the vehicular carriage of caterpillar tractors from place to place as may be desired; to utilize the motive power of the tractor to propel the vehicle by which said tractor is carried; to employ treadmill mechanism both for propelling said vehicle and for affording operative connection with said motive power; to permit the tractor to be loaded and unloaded upon and from said vehicle easily and without material loss of time; to firmly install and secure said tractor upon said vehicle in operative position; to drive said vehicle upon the road solely through the use of the motive power of said tractor and its operative mechanism; and generally to provide for the transportation of caterpillar tread machinery at increased speed, with greater economy, and with less wear and tear on equipment and highways. Other objects will appear as illustrated in the drawing and as hereinafter set forth and described.

While I am aware that it is old to provide special forms of trucks and other vehicles for loading and transporting tractors, I believe myself to be the first person in the art to produce a truck for transporting the usual form of tractor with caterpillar treads, the said truck being equipped with treadmill tracks arranged to be operated and controlled by said treads, and the said tracks serving as operative means for propelling, stopping or backing of said truck and controlling the direction of travel thereof.

Generally speaking, my invention consists in a double rolling platform or treadmill mounted on a carriage provided with four or more pneumatic-tired wheels, which construction gets its motive power and is controlled directly from the caterpillar equipment being transported. Each of these wheels is individually hung or axled, allowing each to revolve independently of the others. The front wheels are geared to be turned by the treadmills and here again each track or treadmill is independent of the other. At the rear of the platform are runways or gangplanks hinged thereto so that a tractor may run up the same and onto the platform under its own power, and so that each caterpillar tread of the tractor will engage with one of the tracks of the treadmill, such tracks being accurately spaced for such purpose. The tractor is then securely fastened to the framework of the platform in such position and in such manner that it cannot move either forward or backward; and when so located with its teads in contact with the said tracks, its motive power becomes the motive power of the truck itself. The treads of the tractor will turn the tracks of the treadmills, and the whole will move on the road on the pneumatic-tired wheels of the carriage at whatever speed is determined by the ratio of gears mounted upon its platform; steering being accomplished by the application of brakes controlling the movement of the treads one side or the other of the tractor as in the normal operation of the same.

Attention is hereby directed to the accompanying drawing, illustrating a preferred form of my invention, in which similar numerals of designation refer to similar parts throughout the several views, and in which—

Figure 2:
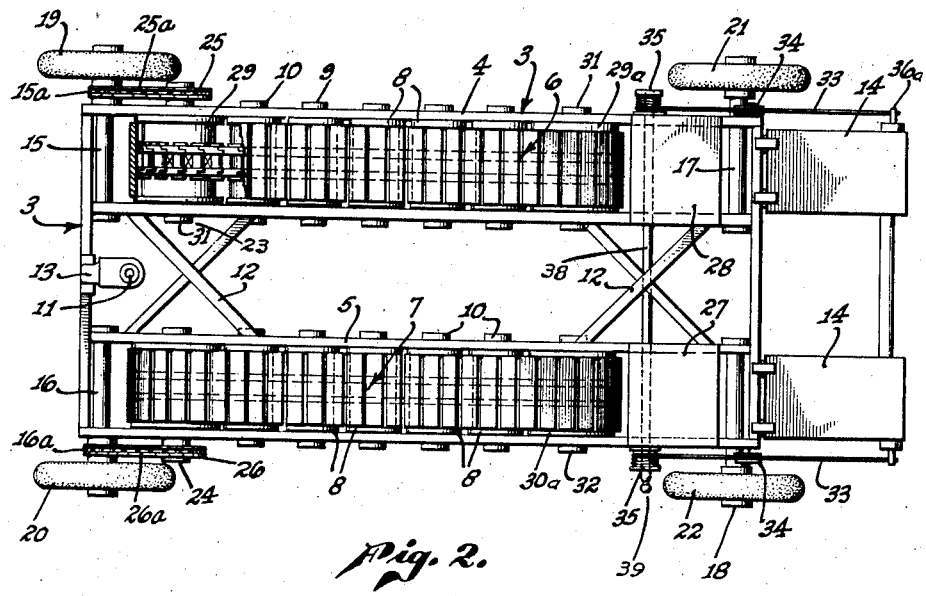

Figure 1 is a side elevation, partly in section, of my improved apparatus, showing a tractor thereon in dotted lines in normal operative position, and Fig. 2 is a plan view, partly in section, of said apparatus.

Referring to the drawing, the main portion of my improved carriage is the frame 3, having incorporated therein the members 4 and 5, each of which is provided with two longitudinally extending walls or strips arranged for reception therebetween of the treadmill tracks 6 and 7. Journalled in bearings in the forward and rear portions of said members, are axles 15, 16, 17 and 18, bearing upon their respective outer ends the pneumatic-tired wheels 19, 20, 21 and 22. As will be observed, each of these axles is separate from the others and is capable of independent operation. Mounted upon the axles 15 and 16 of the front wheels 19 and 20, are the gears 15a and 16a, connected respectively by sprocket chains 25a and 26a to the gears 25 and 26, mounted upon the shafts 23 and 24, which shafts are journalled in bearings in said members 4 and 5 adjacent to shafts 15 and 16.

Mounted upon the shafts 23 and 24, are drums 29 and 30, each of which bears on its periphery a gear or circumferentially disposed cogs meshing with the chains of the treadmill tracks 6 and 7 respectively. At the other ends of the members 4 and 5, are similarly mounted the idling shafts 31 and 32, each bearing thereon drums and gears 29a and 30a similar to those of drums 29 and 30 and similarly connected to the chains of the tracks 6 and 7. Also are provided the supporting treadmill rollers 8 mounted upon shafts 9 journalled in bearings 10 in the walls of the members 4 and 5, said rollers serving to hold the treadmill tracks 6 and 7 in horizontal position and to afford proper contact with the treads of the tractor T, here indicated in dotted lines.

Braces 12 serve to support and hold the members 4 and 5 in spaced operative position. To permit the tractor T readily to be driven upon the carriage, I preferably provide the floor plates 27 and 28 (each secured to rearward ends of members 4 and 5), and the ramps 14, hingedly fastened as shown to the rear of the frame 3. For securing the said tractor to said carriage and preventing movement thereon when installed in operative position, is the bracket 13 affixed to the front end of the frame 3, which bracket is constructed with jaws and a pin 11 for attaching the draw bar 37 of the truck T. For elevating or lowering said ramps, I provide pulley wheels 34, mounted upon posts 36 affixed to the rear end of said frame on opposite sides thereof, over which run the cables 33 connected at one of their ends to the studs 36a affixed to the ramps 14 and at their other ends to the winches 35 upon the rod 38, mounted to turn upon the main frame 3, and operated by the crank 39.

To operate my improved apparatus, I dispose the same as shown in Fig. 1, with the ramps 14 touching the ground, in some location convenient for the reception of the tractor T. Such tractor is then driven upon the said carriage, and is positioned as shown in Fig. 1, with the treads thereof in contact with the treadmill tracks 6 and 7 of said carriage. Being in proper operative position, the draw bar of said tractor is then secured to the bracket 13 by means of the bolt 11, and the ramps 14 are raised from the ground and held in elevated position by the cables 33 and winches 35. Thereupon, the usual mechanism operated by the motive power of the tractor is started, the caterpillar treads caused to move, and by reason of their contact with the treadmill tracks 6 and 7, such tracks made to move, and through their gears and connections the front wheels 19 and 20 are caused to revolve and the carriage to move upon the highway. After this it is a simple matter to govern such movement of the carriage, for by the operation of the usual controls of the tractor the carriage can be made to proceed, to back, and to turn in the same manner as the tractor if detached from said carriage, although at much increased speed and mobility with saving of wear and repairs upon the tractor.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

What I claim and desire to secure by Letters Patent is:

1. In a carrier for transporting equipment provided with caterpillar treads, the combination of endless track mechanism for driving said carrier, and means for operatively connecting said mechanism with the caterpillar treads of the equipment carried upon said carrier.

2. In a carrier for transporting equipment provided with caterpillar treads, the combination of horizontally disposed endless track mechanism for driving said carrier, and means for operatively connecting said mechanism with the caterpillar treads of the equipment carried upon said carrier.

3. In a carrier for transporting equipment provided with caterpillar treads, the combination of horizontally disposed double endless track mechanism for driving said carrier, and means for operatively connecting the tracks of said mechanism each independently operable of the other with the caterpillar treads of the equipment carried upon said carrier.

4. In a carrier for transporting equipment provided with caterpillar treads, the combination of endless track mechanism for driving said carrier, means for supporting the upper level of the tracks of said mechanism substantially straight and in uniform line of travel, and means for operatively connecting said treadmill mechanism with the caterpillar treads of the equipment carried upon said carrier.

5. In a carrier for transporting equipment provided with caterpillar treads, the combination of endless track mechanism for driving said carrier, rollers mounted upon said carriage beneath the upper level of said track and serving to hold said track substantially straight and in uniform line of travel, and means for operatively connecting said treadmill mechanism with the caterpillar treads of the equipment carried upon said carrier.

6. In a carrier for transporting equipment provided with caterpillar treads, the combination of two endless tracks each of which is independently mounted upon said carrier and operates both to move and steer the same, mechanism for driving said tracks, and means for operatively connecting said driving mechanism with the treads of the equipment carried upon said carrier.

7. In a carrier for transporting equipment provided with caterpillar treads, the combination of endless track mechanism for driving said carrier, the track of said mechanism being positioned to engage with the treads of the equipment mounted thereon and carried upon said carrier, and means for securing said equipment in position on said carrier so as to permit operation of said track mechanism through the motive power of said equipment.

8. In a carrier for transporting equipment provided with caterpillar treads, the combination of double endless track mechanism for driving said carrier, the tracks of said mechanism being spaced and positioned to engage with the treads of the equipment mounted thereon and carried upon said carrier, and means for securing said equipment in position on said carrier so as to permit operation of said track mechanism through the motive power of said equipment.

9. In a carrier for transporting tractors with caterpillar treads, the combination of treadmill mechanism for driving said carriage, said treadmill being positioned to engage with the treads of the tractor carried upon said carrier, and means for securing said tractor in position on said carrier so as to permit operation of said treadmill mechanism through the motive power of said tractor, and ramps hingedly connected with said carrier to permit said tractor to be driven thereon.

10. In a carrier for transporting tractors with caterpillar treads, the combination of double track treadmill mechanism for driving said carrier, said tracks being spaced and positioned to engage with the treads of the tractor carried upon said carrier, means for securing said tractor in position on said carrier so as to permit operation of said treadmill mechanism through the motive power of said tractor, and ramps hingedly connected with said carrier to permit said tractor to be driven thereon.

11. In a carrier for transporting equipment provided with caterpillar treads, the combination of stiff link endless track mechanism for driving said carrier, and means for operatively connecting said mechanism with the caterpillar treads of the equipment carried upon said carrier.

12. In a carrier for transporting equipment provided with caterpillar treads, the combination of double stiff link endless track mechanism for driving said carrier, and means for operatively connecting the tracks of said mechanism with the caterpillar treads of the equipment carried upon said carrier.

EVATT A. McCLENEGHAN.